(12) United States Patent
Coretto et al.

(10) Patent No.: US 11,982,358 B2
(45) Date of Patent: May 14, 2024

(54) INLINE PNEUMATIC VALVE WITH INTERNAL BUSHING

(71) Applicant: Hamilton Sundstrand Corporation, Charlotte, NC (US)

(72) Inventors: August M. Coretto, Windsor, CT (US); Scott W. Simpson, Feeding Hills, MA (US); Donald E. Army, Enfield, CT (US); Peter J. Dowd, Granby, CT (US); David J. Zawilinski, W. Granby, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/508,485

(22) Filed: Oct. 22, 2021

(65) Prior Publication Data

US 2023/0126388 A1    Apr. 27, 2023

(51) Int. Cl.
*F16K 1/12* (2006.01)
*F04D 27/02* (2006.01)

(52) U.S. Cl.
CPC .......... *F16K 1/126* (2013.01); *F04D 27/0215* (2013.01); *F04D 27/023* (2013.01)

(58) Field of Classification Search
CPC ..... F16K 1/126; F04D 27/0215; F04D 27/023
USPC .................................................. 277/585, 571
See application file for complete search history.

(56) References Cited

U.S. PATENT DOCUMENTS

| 3,092,132 | A | * | 6/1963 | Kenneth | ............. | F16K 1/12 |
| | | | | | | 137/219 |
| 3,521,661 | A | * | 7/1970 | Kurt | ............. | F04D 27/023 |
| | | | | | | 137/220 |
| 3,529,619 | A | * | 9/1970 | Newman, Jr. | ............ | F16K 1/126 |
| | | | | | | 137/219 |
| 3,825,026 | A | | 7/1974 | Salerno et al. | | |
| 3,865,128 | A | * | 2/1975 | Zadoo | ................. | G05D 16/106 |
| | | | | | | 137/220 |

(Continued)

FOREIGN PATENT DOCUMENTS

EP    3246607 A1    11/2017
WO    89/11611 A1    11/1989

OTHER PUBLICATIONS

European Search Report for EP Application No. 22202790.6 dated May 8, 2023.

*Primary Examiner* — Craig J Price
*Assistant Examiner* — Andrew J Rost
(74) *Attorney, Agent, or Firm* — Carlson, Gaskey & Olds, P.C.

(57) ABSTRACT

An inline valve includes a sliding piston having a radially outer stop portion with a forward end. A radially inner sliding portion is connected to the radially outer stop portion by an arm. A housing includes an outer housing body surrounding the piston. The housing has a stop surface selectively in contact with the forward end of the radially outer stop portion of the piston to block flow for a housing inlet to a housing outlet. The radially inner sliding portion slides on a support tube. At least a portion of the radially inner sliding portion is formed of a first material having better wear resistance than a second material forming the outer stop portion of the piston. The second material has a greater resistance to high temperature and pressure than the first material. A vent valve for a compressor is also disclosed.

14 Claims, 4 Drawing Sheets

(56) References Cited

U.S. PATENT DOCUMENTS

| | | | | |
|---|---|---|---|---|
| 4,197,873 | A | * | 4/1980 | Minogue ................. F16K 1/126 406/126 |
| 4,747,426 | A | * | 5/1988 | Weevers ............... F16K 15/063 137/220 |
| 4,798,181 | A | * | 1/1989 | Beer ......................... F01L 3/08 123/188.9 |
| 5,012,841 | A | * | 5/1991 | Kueffer ................... F16K 47/04 137/896 |
| 5,477,673 | A | * | 12/1995 | Blais .................. F04D 27/0215 60/785 |
| 5,540,252 | A | * | 7/1996 | Bruun ................. G05D 7/0146 137/220 |
| 6,122,905 | A | * | 9/2000 | Liu ....................... F04D 27/023 60/785 |
| 6,202,671 | B1 | * | 3/2001 | Horstmann ............... F02K 9/58 137/219 |
| 8,910,653 | B2 | * | 12/2014 | McAuliffe .......... F16K 31/1223 137/220 |
| 9,784,184 | B2 | | 10/2017 | Marocchini et al. |
| 10,865,715 | B2 | | 12/2020 | Greenberg et al. |
| 2005/0019156 | A1 | * | 1/2005 | D'Angelo ............. F01D 17/105 415/144 |

\* cited by examiner

INLINE PNEUMATIC VALVE WITH INTERNAL BUSHING

STATEMENT REGARDING FEDERALLY SPONSORED RESEARCH OR DEVELOPMENT

This invention was made with Government support under FA8626-16-C-2139 awarded by the United States Air Force. The Government has certain rights in this invention.

BACKGROUND OF THE INVENTION

This application relates to an inline valve wherein surfaces that slide along a support tube are formed of a wear resistant material, and other portions of a sliding piston valve are formed of a material selected to withstand high pressure and temperature.

Inline valves are known, and typically include a piston which slides on a support tube between open and closed positions. One application of such a system is a vent valve for selectively venting air from a compressor of a gas turbine engine.

Modern gas turbine engines and other systems are producing higher pressures and temperatures from compressor section. As the pressures and temperatures increase, providing a valve piston which can survive these challenges becomes increasingly difficult.

SUMMARY OF THE INVENTION

An inline valve includes a sliding piston having a radially outer stop portion with a forward end. A radially inner sliding portion is connected to the radially outer stop portion by an arm. A housing includes an outer housing body surrounding the piston. The housing has a stop surface selectively in contact with the forward end of the radially outer stop portion of the piston to block flow for a housing inlet to a housing outlet. The radially inner sliding portion slides on a support tube. At least a portion of the radially inner sliding portion is formed of a first material having better wear resistance than a second material forming the outer stop portion of the piston. The second material has a greater resistance to high temperature and pressure than the first material.

A vent valve for a compressor is also disclosed.

These and other features of the present invention can be best understood from the following specification and drawings, the following of which is a brief description.

DETAILED DESCRIPTION

Figure 1A:
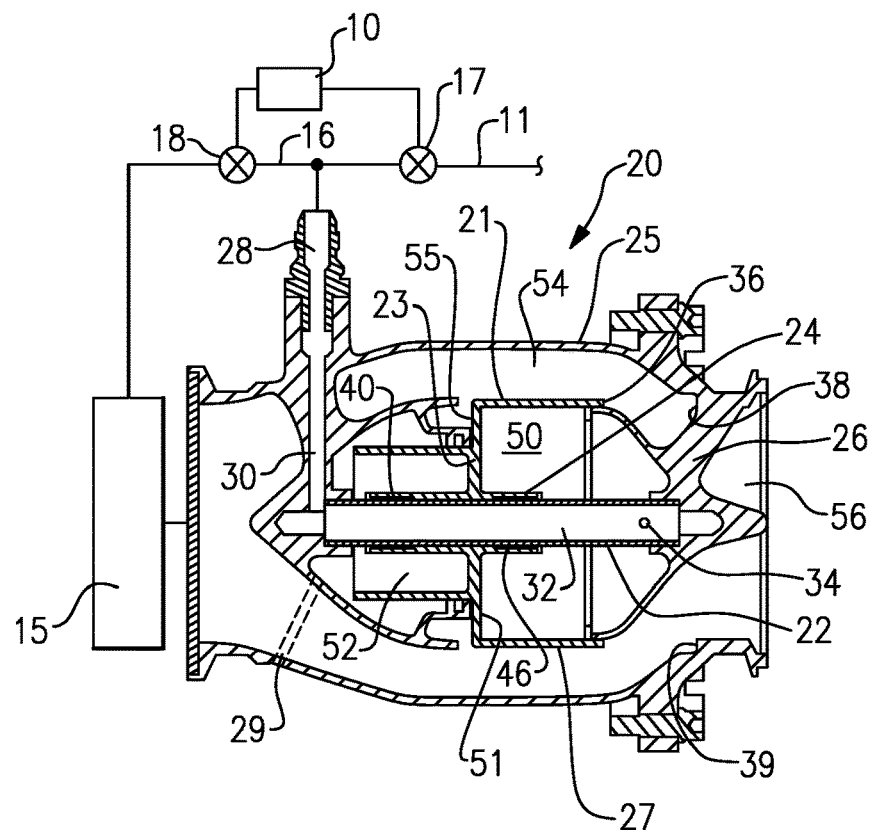
FIG. 1A shows an example valve in an open position.

A valving system 20 is illustrated in FIG. 1A. A piston 21 slides on a central support tube 22. An extending arm 23 connects a radially outer piston stop portion 27 to a radially inner sliding portion 24. Inner sliding portion 24 is supported on a support tube 22. A housing 25 encloses the piston 21 and includes a plurality of arms 26 which are circumferentially spaced. A control tube 28 selectively controls an air supply either from an ambient source 11, or from a compressor 15 such as may be included in an associated gas turbine engine. Ambient air from line 11 may pass through a valve 17 to connection 16, into tube 28 and into passages 30/32 and outwardly through holes 34. Alternatively, a control 10 may open a valve 18, and close valve 17 to supply high pressure air from the compressor 15 through the passages 30/32 and holes 34. This air passes into a chamber 50 which is forward of a face 51 of the piston 21. Piston 21 has a forward end 36 which is shown spaced from a stop 38 on the housing in the position illustrated in FIG. 1A. Another portion 39 of the stop on the housing 25 is also illustrated.

In the FIG. 1A position, control 10 closes valve 17 and opens valve 18. Valves 17 and 18 can also be replaced by a servo valve or a solenoid valve. Now, pressurized air is delivered into the chamber 50. This acts on face 51 forcing the piston 21 to the left, such that end 36 is spaced from stop 38/39. Note that a chamber 52 on an opposed side of face 51 from chamber 50 is communicating with ambient pressure through a tap 29.

Control 10 will send pressure to chamber 50 to move the pistons to this position when it is desired to have air pass through chamber 54, and to an outlet 56. Again, one situation where this may be desirable is to vent the compressor 15 associated with a gas turbine engine such as at start up. Also, venting may be utilized when high temp bleed air is desired for other purposes, e.g. anti-ice valves.

Figure 1B:
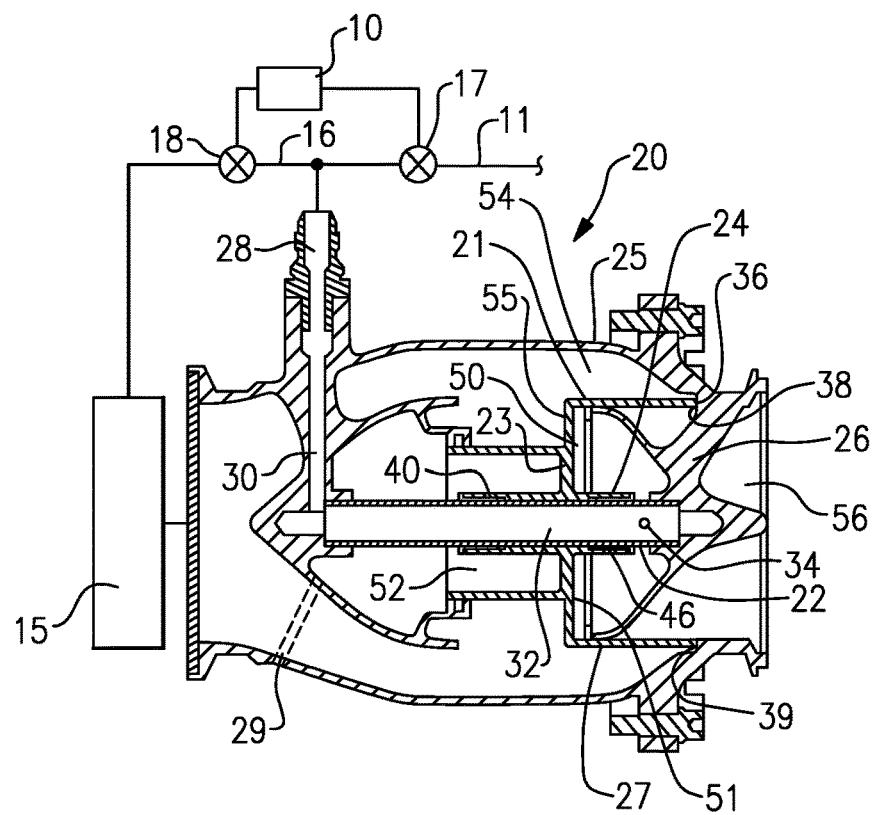
FIG. 1B shows an example valve in a closed position.

At times it may be desirable to close the valve 20. In such a situation, the control 10 closes valve 18 and opens valve 17 or other similar device as above. Now, the connection 30/32 and hole 34 receive ambient pressure into chamber 50. With ambient pressure in chamber 50 the pressurized air in chamber 54 behind a face 55 of the piston 21, drives the piston to a closed position such as shown in FIG. 1B wherein end 36 abuts stops 38/39 and air will not flow from the inlet chamber 54 to the outlet 56.

Compressors in gas turbine engines are beginning to develop higher and higher temperatures and pressures. The same is true of other application that use inline valves. As such, it would be desirable to form piston 21 of materials (such as Nickel based alloys, as examples Inconel® or Haynes® 282) which can withstand higher pressures and temperatures while maintaining high strength limits. However, such materials do not provide good wear resistance when sliding along the support tube 22. As such, in valve 20 bushings 40 and 46 are mounted within the sliding portion 24.

The guide tube 22 may be formed of high temperature/ high strength material such as nickel alloys including Inconel® 718 and Haynes® 282. However, lower strength, good wear resistant materials may also be utilized such as Stellite 6B® or Stellite 3®. In addition, the tube 22 may be coated with a chrome-carbide hardcoat, or other hardcoats to improve wear resistance.

As known, Stellite is a trademark for cobalt-based alloys, with significant proportions of chromium and tungsten.

Figure 1C:
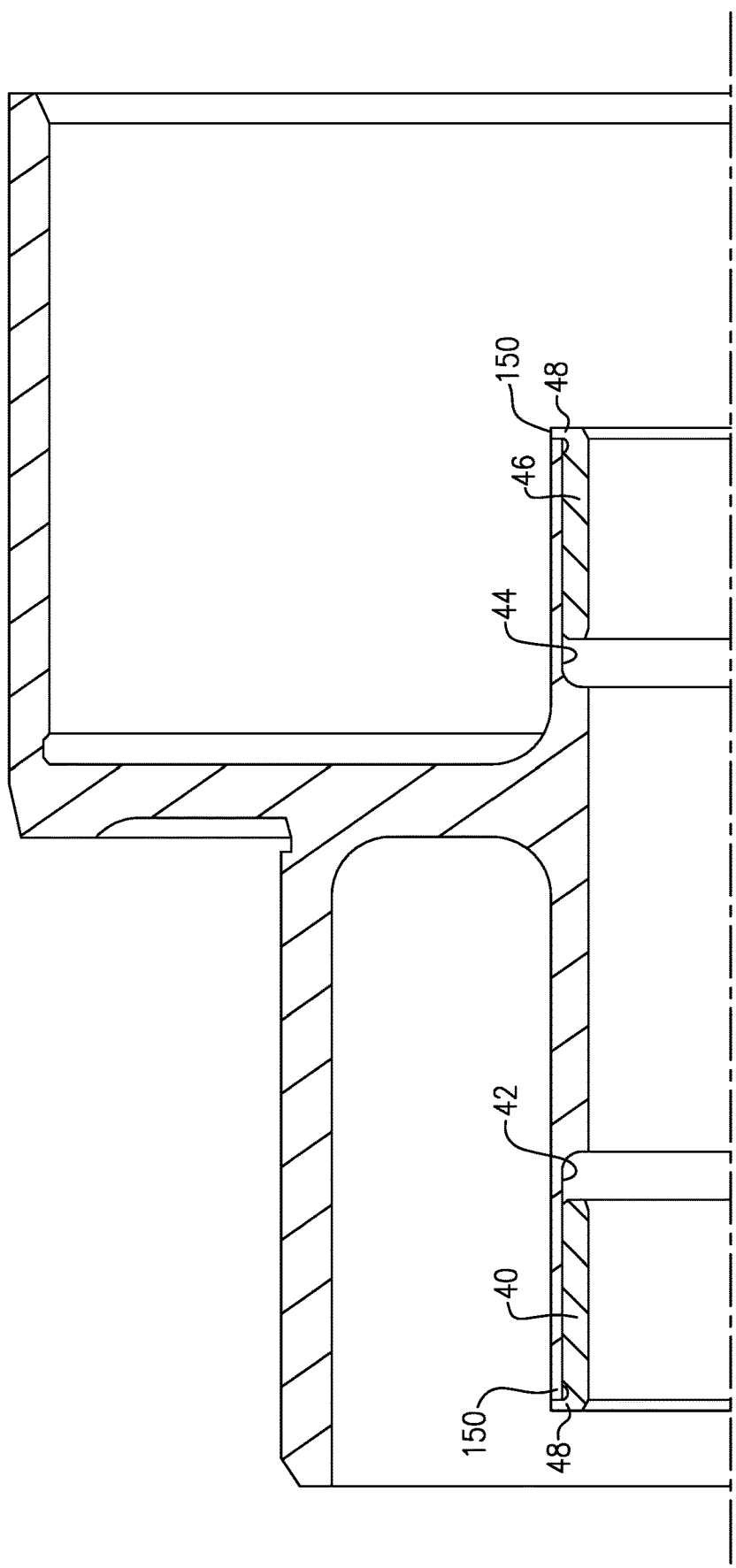
FIG. 1C is a detail of a portion of the valve.

As shown in FIG. 1C, bushing 40 is received in a groove 42, and bushing 46 is received within a groove 44. Each of the bushings 40 and 46 have a secondary retention 48 abutting an end 150 of the sliding portion 24. In embodiments bushings 40/46 are force fit onto grooves 42/49. High wear resistant material is typically harder to machine then the material that would otherwise form the piston 21. As one example, Stellite 6B® or Stellite 3® may be utilized. However, Stellites may not be able to withstand the temperatures while maintaining a high enough strength limit for the pressures and loads applied. Thus, the bushings are disposed in a location of low stress only and as an effect of press fit are kept in a compressively loaded scenario with minimal tensile loads. The body of the piston 21 can otherwise be formed by materials which are suited for withstanding such challenges.

Figure 2:
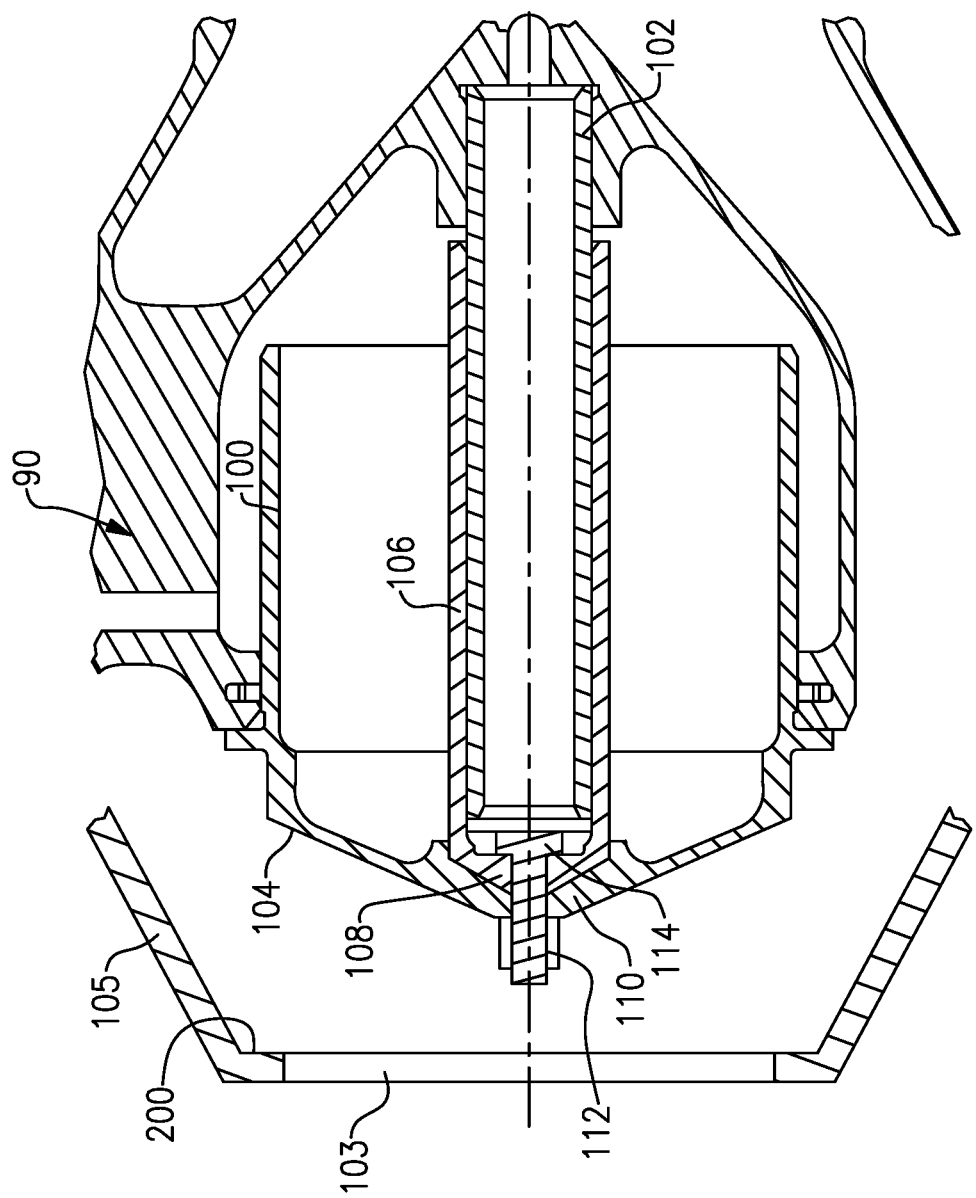
FIG. 2 shows a distinct embodiment.

FIG. 2 shows another embodiment 90 wherein the piston 100 has a distinct forward face 104 selectively abutting a stop 200 on a housing 105 which includes the outlet 103. The valve 90 may otherwise operate as the FIG. 1A-1C embodiment and be driven to abut the stop 200, or be withdrawn from the stop 200.

As shown, in embodiment 90, inner sliding portion 106 is received on support tube 102. Sliding portion 106 includes a forward end 108 abutting a radially inner end 110 of the forward face 104. Forward face acts as the arm to connect the inner and outer portions. A bolt 114 is received on a threaded member 112 to force the section 110 against the section 108 and secure the inner sliding portion 106. The inner sliding portion 106 may be formed of a material having good wear resistance, whereas the remainder of the piston 100 may be formed of a material similar to that used for portion 27.

Figure 3:
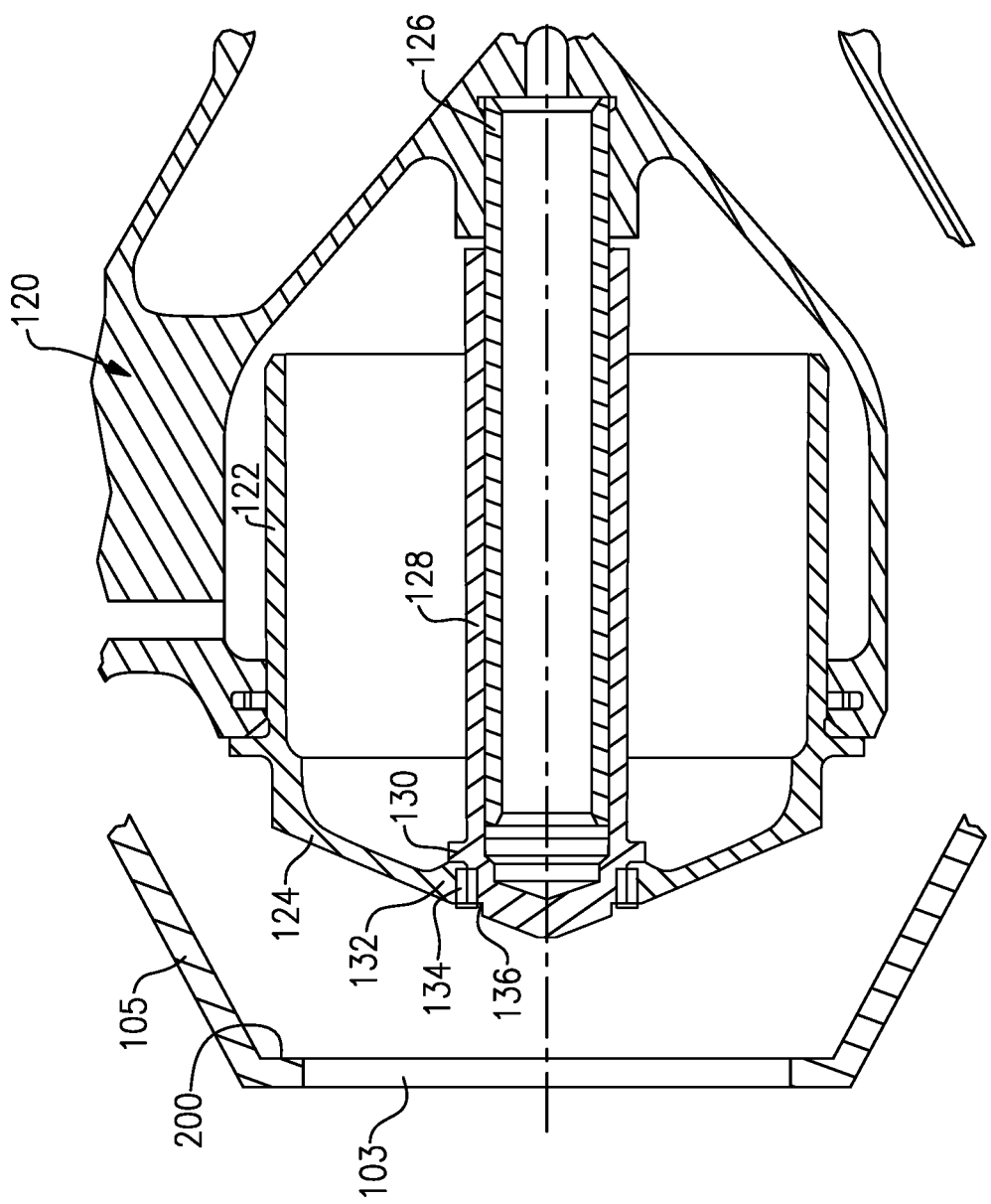
FIG. 3 shows yet another embodiment.

FIG. 3 shows yet another embodiment 120 wherein the piston 122 has the forward face 124 and an inner sliding portion 128 sliding on a fixed tube 126. Here, the inner sliding portion 128 is welded to the remainder of the piston body. A stop 130 is shown abutting a radially inner end 132 of the forward face 124. Weld materials 134 and 136 weld the structure together. Again, the material for the sliding portion 128 may have good wear resistance whereas the material for the remainder of the piston body may be selected for resistance to high pressure temperatures.

The radially inner sliding portions 106/128 can be read as a bushing.

Notably, the FIG. 2 or 3 embodiments could be substituted in a valve arranged as in the FIG. 1A-1C embodiment, and the bushings as shown in FIGS. 1A and 1B may be incorporated into a valve structure as in the FIG. 2 or 3 embodiments.

An inline valve under this disclosure could be said to include a sliding piston having a radially outer stop portion with a forward end, and a radially inner sliding portion connected to the radially outer stop portion by an arm. A housing includes an outer housing body surrounding the piston. The housing has a stop surface selectively in contact with the forward end of the radially outer stop portion of the piston to block flow for a housing inlet to a housing outlet. The radially inner sliding portion slides on a support tube. The radially inner sliding portion has a bushing formed of a first material having a better wear resistance than a second material forming the radially outer stop portion of the piston. The second material has a greater resistance to high temperature and pressure than the first material A worker of skill in this art would recognize the properties that give high temp/pressure resistance is primarily material strength, either yield or fatigue limits. Many materials include a "temperature correction factor" where above a certain temperature, yield and fatigue limits will drop dramatically. To create a piston out of materials that have low yield and fatigue limits at temperature that is strong enough for the disclosed purposes would be exceptionally heavy. Also, it is difficult to produce. Good wearing materials frequently are hard to machine.

Properties that give good wear resistance are more related to surface effects, for example volume loss during abrasive sliding tests, or resistant to galling/metal pick up, such that during cyclic operating there is a consistent coefficient of friction, rather than binding that occurs. Lower strength limits are permissible if used in low stress portions of assembly.

An inline valve under this disclosure could be said to include a sliding piston having a radially outer stop portion with a forward end, and a radially inner sliding portion connected to the radially outer stop portion by an arm. A housing includes an outer housing body surrounding the piston. The housing has a stop surface selectively in contact with the forward end of the radially outer stop portion of the piston to block flow for a housing inlet to a housing outlet. The radially inner sliding portion slides on a support tube and has a bushing formed of a first material having a better wear resistance than a second material forming the radially outer stop portion of the piston. The second material has a greater resistance to high temperature and pressure than the first material.

A vent valve for a compressor associated with a gas turbine engine under this disclosure could be said to include a valve inlet to be connected to a compressor in a gas turbine engine. A sliding piston has a radially outer stop portion with a forward end, and a radially inner sliding portion is connected to the radially outer stop portion by an arm. A housing includes an outer housing body surrounding the piston, and the housing has a stop surface selectively in contact with the forward end of the radially outer stop portion of the piston to block flow for a housing inlet to a housing outlet. The radially inner sliding portion slides on a support tube, and has a bushing formed of a first material having a better wear resistance than a second material forming the radially outer stop portion of the piston. The second material has a greater resistance to high temperature and pressure than the first material. The first material is a cobalt based allow including chromium and tungsten, and the second material is a nickel alloy.

An inline valve under this disclosure could alternatively be said to include a sliding piston having a radially outer stop portion with a forward end. A radially inner sliding portion is connected to the radially outer stop portion by an arm. A housing includes an outer housing body surrounding the piston. The housing has a stop surface selectively in contact with the forward end of the radially outer stop portion of the piston to block flow for a housing inlet to a housing outlet. The radially inner sliding portion slides on a support tube. The radially inner sliding portion has bushing means having a better wear resistance than a resistance means forming the radially outer stop portion of the piston. The resistance means has a greater resistance to high temperature and pressure than the bushing means.

The bushing means is formed of a cobalt bared alloy including chromium and tungsten, and the resistance means is a nickel alloy.

Although embodiments of this disclosure have been shown, a worker of ordinary skill in this art would recognize that modifications would come within the scope of this disclosure. For that reason, the following claims should be studied to determine the true scope and content of this disclosure.

What is claimed is:

1. An inline valve comprising:
   a sliding piston having a radially outer stop portion with a forward end, and a radially inner sliding portion connected to the radially outer stop portion by an arm; and
   a housing including an outer housing body surrounding the piston, and the housing having a stop surface selectively in contact with the forward end of the radially outer stop portion of the piston to block flow from a housing inlet to a housing outlet, and the radially inner sliding portion slides on a support tube, and the radially inner sliding portion having a bushing formed of a first material having a better wear resistance than a second material forming the radially outer stop portion of the piston, and the second material having a greater resistance to high temperature and pressure than the first material;

wherein the bushing is provided by at least one distinct bushing providing in a groove formed in the radially inner sliding portion of the valve, with the remainder of the sliding portion of the valve formed of a material having a greater resistance to temperature and pressure than the material forming the bushing;

wherein the bushing is force fit into the groove;

wherein the bushing has an end stop axially outward of an axial end of the radially inner sliding portion formed by the second material; and wherein the first material is a cobalt based alloy including chromium and tungsten, and the second material is a nickel alloy.

2. The inline valve as set forth in claim 1, wherein a control selectively controls pressure into a first chamber between a forward face of the arm of the piston and the radially outer stop portion, and the control selectively providing a compressed air to the first chamber or an ambient pressure into the first chamber, such that the control can move the valve between open and closed positions.

3. An inline valve comprising:
a sliding piston having a radially outer stop portion with a forward end, and a radially inner sliding portion connected to the radially outer stop portion by an arm;
a housing including an outer housing body surrounding the piston, and the housing having a stop surface selectively in contact with the forward end of the radially outer stop portion of the piston to block flow from a housing inlet to a housing outlet, and the radially inner sliding portion slides on a support tube, and the radially inner sliding portion having a bushing formed of a first material having a better wear resistance than a second material forming the radially outer stop portion of the piston, and the second material having a greater resistance to high temperature and pressure than the first material;
wherein the radially inner sliding portion is formed by a separate tube secured to the arm; and
wherein the first material is a cobalt based alloy including chromium and tungsten, and the second material is a nickel alloy, with the separate tube formed of the first material.

4. The inline valve as set forth in claim 3, wherein the tube is bolted to the portion of the valve providing the stop surface.

5. The inline valve as set forth in claim 4, wherein the tube is welded to the arm.

6. A vent valve for a compressor associated with a gas turbine engine comprising:
a valve inlet to be connected to a compressor in a gas turbine engine;
a sliding piston having a radially outer stop portion with a forward end, and a radially inner sliding portion connected to the radially outer stop portion by an arm;
a housing including an outer housing body surrounding the piston, and the housing having a stop surface selectively in contact with the forward end of the radially outer stop portion of the piston to block flow from a housing inlet to a housing outlet, and the radially inner sliding portion slides on a support tube, and the radially inner sliding portion having a bushing formed of a first material having a better wear resistance than a second material forming the radially outer stop portion of the piston, and the second material having a greater resistance to high temperature and pressure than the first material;
wherein said first material is a cobalt based alloy including chromium and tungsten, and said second material is a nickel alloy; and
at least one of the following is included:
wherein the bushing is provided by at least one distinct bushing providing in a groove formed in the radially inner sliding portion of the valve, with the remainder of the sliding portion of the valve formed of a material having a greater resistance to temperature and pressure than the material forming the bushing, the bushing is force fit into the groove;
wherein the bushing has an end stop axially outward of an axial end of the radially inner sliding portion formed by the second material; or
wherein the radially inner sliding portion is formed by a separate tube secured to the arm.

7. The vent valve as set forth in claim 6, wherein a control selectively controls pressure into a first chamber between a forward face of the arm of the piston and the radially outer stop portion, and the control selectively providing a compressed air to the first chamber or an ambient pressure into the first chamber, such that the control can move the valve between open and closed positions.

8. The vent valve as set forth in claim 7, wherein a chamber on a rearward face of the piston remote from the chamber on the forward face is vented to ambient.

9. The vent valve as set forth in claim 6, wherein the bushing is provided by at least one distinct bushing providing in a groove formed in the radially inner sliding portion of the valve, with the remainder of the sliding portion of the valve formed of a material having a greater resistance to temperature and pressure than the material forming the bushing, the bushing is force fit into the groove.

10. The vent valve as set forth in claim 9, wherein the bushing has an end stop axially outward of an axial end of the radially inner sliding portion formed by the second material.

11. The vent valve as set forth in claim 9, wherein there are a pair of the bushings, with one bushing associated with each of two axial ends of the radially inner sliding portion.

12. The vent valve as set forth in claim 6, wherein the radially inner sliding portion is formed by a separate tube secured to the arm.

13. The vent valve as set forth in claim 12, wherein the tube is bolted to the portion of the valve providing the stop surface.

14. The vent valve as set forth in claim 12, wherein the tube is welded to the arm.

* * * * *